United States Patent [19]
Cox

[11] 3,786,799
[45] Jan. 22, 1974

[54] PULSE RELIEF DAMPER
[75] Inventor: Paul D. Cox, Ridgeville, Ind.
[73] Assignee: Cox Manufacturing Co., Inc., Ridgeville, Ind.
[22] Filed: Feb. 7, 1972
[21] Appl. No.: 224,190

[52] U.S. Cl. .................. 126/91 A, 431/19, 431/158
[51] Int. Cl. ............................................. F24c 3/06
[58] Field of Search 126/91 A, 91 R; 431/353, 158, 431/19

[56] References Cited
UNITED STATES PATENTS
| | | | |
|---|---|---|---|
| 1,900,570 | 3/1933 | Leiman | 431/19 |
| 3,399,833 | 9/1968 | Johnson | 126/91 R |
| 3,319,692 | 5/1967 | Reba et al. | 431/353 |
| 1,717,658 | 6/1929 | Bryant | 431/19 |

*Primary Examiner*—William E. Wayner
*Assistant Examiner*—William E. Tapolcai, Jr.

[57] ABSTRACT

For use with a tube-fired radiant heating system which includes a serially connected fuel combusting device and an elongated, hollow radiant heating tube, a pressure-pulse relief damper comprising a chamber having a first opening therein which communicates with the interior of the radiant heating tube at a point adjacent the fuel combusting device and a second opening therein disposed remotely with respect to the first opening and communicating with the atmosphere. A normally closed, unidirectional valve means is mounted within the chamber for preventing the flow of air through the chamber from the radiant heating tube to the atmosphere and which is responsive to a sub-atmospheric pressure in the radiant heating tube for permitting the flow of air from the atmosphere to the interior of the radiant heating tube.

10 Claims, 4 Drawing Figures

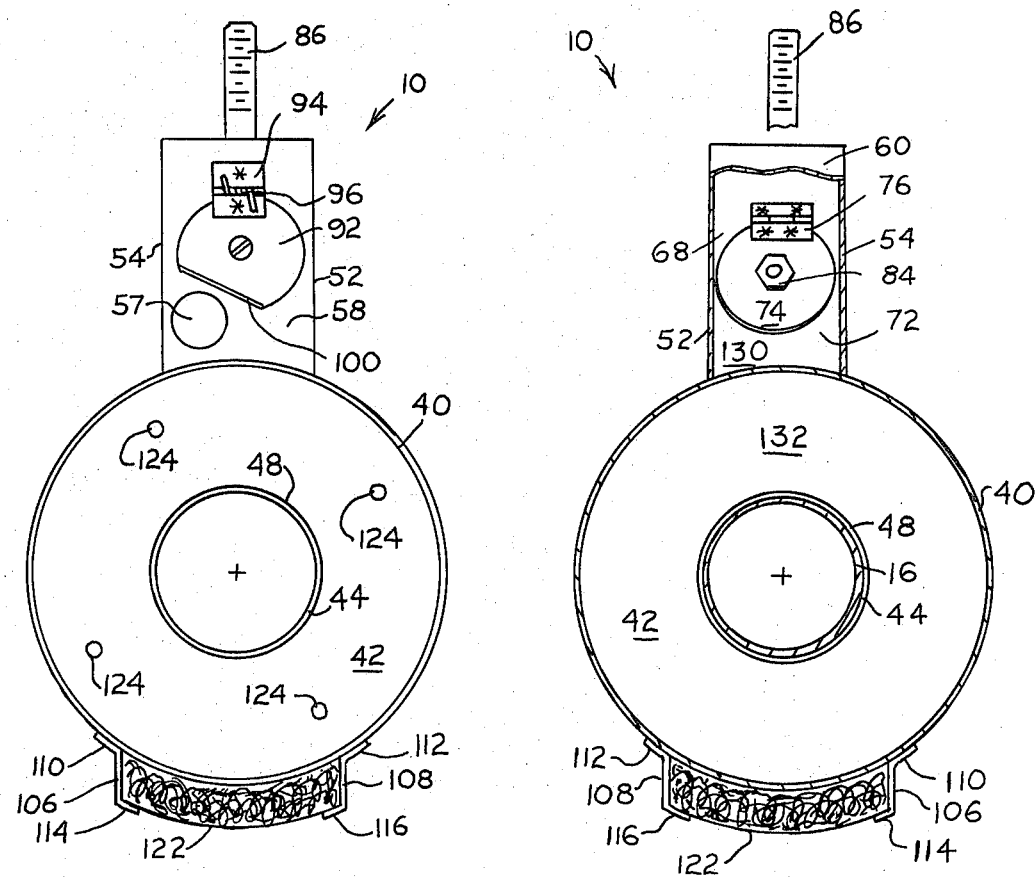
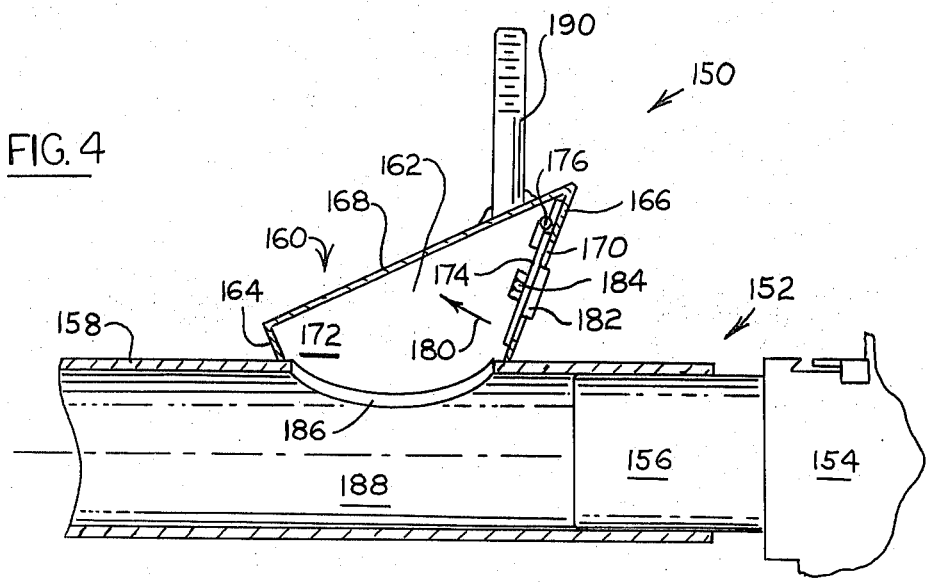

3,786,799

PULSE RELIEF DAMPER

BACKGROUND OF THE INVENTION

1. Field of the Invention

The invention relates to tube-fired radiant heating systems which include a fuel combusting device and an elongated, hollow radiant heating tube, and more particularly, to a device connected to the radiant heating tube at a point adjacent the fuel combusting device for damping pressure-pulses with the system.

2. Description of the Prior Art

One type of heating system which has found wide use is the tube-fired radiant heating system. This type of system conventionally incorporates two basic units, these being a gun-type fuel combusting device and an elongated, hollow tube. The gun-type fuel combusting device or burner includes a combustion chamber in which fuel, such as natural gas, propane gas, or fuel oil, is mixed with air and burned, the burning gases being exhausted under pressure via a "blast-tube" into one end of the radiant heating tube.

Under steady state operation, this type of heating system is efficient and trouble free. However, in normal use the system must cycle on and off periodically in accordance with heating requirements within the area in which the system is installed. It is during these periods, when the system is being ignited or extinguished, that some difficulties are encountered. Specifically, when the system is first ignited, the initial ignition of the fuel-air mixture generates a positive pressure-pulse within the heating tube. As this pulse propagates through the radiant heating tube it produces a negative pressure-pulse or node within the system. Due to the length of the tube, the initial pressure-pulse can cause the pressure within the system to resonate thereby tending to cause the combustion within the system to pulsate rather than attain a steady state operation. Further, complete combustion of the fuel does not take place immediately whereby, when the fuel being used is oil, some smoke will be produced during the first moments of ignition. Because the end of the heating tube distal the burner is also open, this smoke is exhausted into the heated area. Also, when this type of system is extinguished or turned off, the heated gases traveling through the radiant heating tube, by reason of their momentum, create a vacuum or negative pressure-node at the inlet end of the tube adjacent the burner which, in the case of a gas-fired system, can cause the pilot flame within the burner to be extinguished.

SUMMARY OF THE INVENTION

The present invention, which serves to overcome these difficulties, comprises generally a first chamber which is provided with a first opening therein which communicates between the first chamber and the interior of the radiant heating tube, and a second opening therein disposed remotely with respect to the first opening and which communicates with the atmosphere. Disposed within the first chamber is a normally closed, unidirectional valve means which, when in its normal condition, prevents the flow of air, gas, or the like, through the first chamber from the radiant heating tube to the atmosphere. The valve means is further responsive to a sub-atmospheric pressure within the radiant heating tube to permit the flow of air or gas via the first chamber from the atmosphere to the interior of the radiant heating tube.

When the damper of the present invention is used with an oil burning system, there is also provided a second chamber serially connected between the first chamber second opening and the atmosphere and a conduit which communicates between the second chamber and the fuel combusting device or burner, the conduit providing a means for passing smoke produced during ignition from the first chamber back into the fuel combusting device wherein it is reburned.

In a specific embodiment of the invention, the unidirectional valve means includes a pivotable flapper element mounted within the first chamber. The flapper element is maintained in a closed position by gravity.

It is therefore an object of the invention to provide a device for eliminating the pressure-pulses occurring during ignition of a tube-fired radiant heating system.

It is another object of the invention to provide such a damper device which eliminates smoking during ignition of such a system which uses oil as a fuel.

It is yet another object of the invention to provide such a damper which prevents extinguishing of the pilot flame in a gas burning system.

It is still 1,3,3-trimethylindolinobenzopyrylospiran object of the invention to provide such a damper which does not interfere or otherwise alter the steady state operation of the heating system.

It is another object of the invention to provide such a damper which can be installed on such a system without major modification thereof.

It is yet another object of the invention to provide such a damper which is compact, reliable in operation, and economical to manufacture.

BRIEF DESCRIPTION OF THE DRAWINGS

The above-mentioned and other features and objects of this invention and manner of attaining them will become more apparent and the invention itself will be best understood by reference to the following description of an embodiment of the invention taken in conjunction with the accompanying drawings, wherein:

FIG. 2 is a rear end-plan view of the pulse damper as viewed from the right in FIG. 1;

FIG. 3 is a cross-sectional view of a pulse damper contain generally along section line 3—3 in FIG. 1; and FIG. 4 is an axial sectional view of a second embodiment of the invention for use on a gas-burning tube-fired radiant heating system.

DESCRIPTION OF THE PREFERRED EMBODIMENTS

Figure 1:
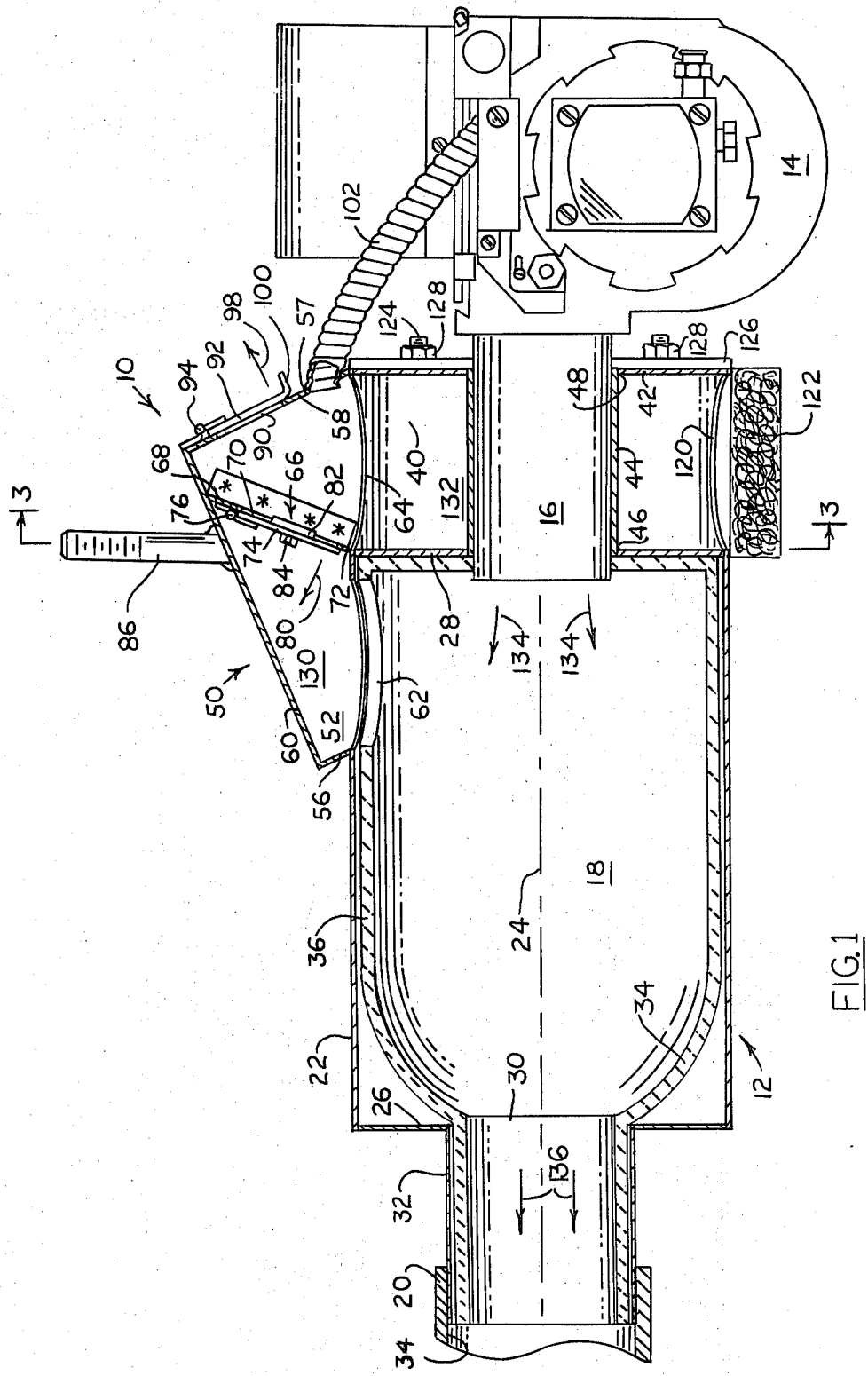
FIG. 1 is an axial-sectional view of a pressure-pulse damper in accordance with the present invention for use on an oil-fired system and shown installed on an oil burning tube-fired radiant heating system.

Referring now to FIGS. 1–3 of the drawings, there is indicated generally at 10 a pressure-pulse relief damper which is mounted on an oil burning, tube-fired radiant heating system 12. Heating system 12 includes an oil burner assembly 14 in which air and fuel are mixed and ignited, and having a blast-tube 16 from which the burning gases are exhausted. System 12 further includes a combustion chamber 18 and an elongated, hollow radiant heating tube 20 through which the hot gases pass to produce the desired radiant heating effect.

Combustion chamber 18 includes an outer casing 22 of generally cylindrical shape having an axis 24 and longitudinally spaced-apart, annular end walls 26 and 28. Circular opening 30 in annular end wall 26 is disposed co-axially of axis 24 and a cylindrical coupling member 32 is fixedly secured to end wall 26, as by welding, coupling member 32 extending outwardly therefrom also co-axially of axis 24. The outside diameter of coupling member 32 is dimensioned to sealably receive and engage the interior wall 34 of heating tube 20.

A liner 36 is received within casing 22, liner 36 being cast or molded of a suitable fire-resistant material such as refractory or ceramic. Liner 36 has a shape complementary to the space bounded by casing 22, annular walls 26,28, and coupling member 32 with the exception that the end 34 of liner 36 adjacent end wall 26 is generally spherical in shape to provide a smoother flow of gases through the apparatus.

Pulse relief damper 10 includes a cylindrical wall 40, preferably formed as an integral part of casing 22, which extends rightwardly (as viewed in FIG. 1) of annular wall 28. The distal end of cylindrical wall 40 is closed by a third annular wall 42 and a hollow, cylindrical sleeve 44 is received through the central openings 46 and 48 in annular walls 28, 42, respectively, and secured as by welding. Sleeve 44 is dimensioned slidably to receive the blast-tube 16 of burner assembly 14, as shown. Walls 28, 40, 42 and sleeve 44 define chamber 132.

Mounted on the top (as viewed in the drawings) of casing 22 and wall 40 is a housing assembly indicated generally at 50 which includes a pair of laterally spaced-apart trapezoidal side walls 52 and 54, parallel, spaced-apart end walls 56 and 58, and a top wall 60.

A first circular port 62 communicates between the interior of housing assembly 50 and combustion chamber 18 and a second circular port 64 communicates between the interior of housing 50 and chamber 132, i.e., the annular space bounded by cylindrical wall 40 and annular walls 28 and 42.

A unidirectional valve assembly 66 is mounted within enclosure 50 and includes a partition wall 68 having a circular opening 70 therethrough. It will be observed that partition wall 68 is disposed at an angle with respect to a vertical plane whereby partition wall 68 has an upwardly angled surface 72. A circular flapper member 74 is pivotably secured adjacent its upper peripheral extremity to upwardly facing surface 72 of partition wall 68 by means of a suitable hinge 76, flapper 74 having a diameter slightly larger than the diameter of opening 70 whereby flapper 74 functions as a pivotable valve which closes opening 70 and which is openable as indicated by arrow 80. It will now be apparent that by reason of the angled positioning of partition 68, the weight of, or the gravitational force on, flapper 74 will maintain same in a closed position. To provide a means for increasing the force required to open flapper 74, a weight disk 82 may be fixedly secured to flapper 74 by means of a suitable threaded fastener 84.

Fixedly secured to top wall 60 of housing 50 is an upstanding threaded stud 86 which provides a means for securing a heat reflector (not shown) in parallel, spaced-apart relationship above the damper 10 and heater assembly 12.

A circular viewing port 90 is formed in wall 58 of housing 50 and a suitable closure plate 92 is pivotably mounted thereover with a hinge 94. Closure plate 92 is resiliently maintained in a closed position by a spring 96 (FIG. 2 only) and may be selectively, manually opened as indicated by arrow 98 by means of a finger tab 100. Viewing port 90 and closure plate 92 thus provide a convenient means for observing the flame within combustion chamber 18.

A flexible conduit or duct 102 is secured through a hole 57 in end wall 58 and has its opposite end coupled to burner assembly 14, duct 102 communicating between the interior of housing assembly 50 and the fan chamber (not shown) of the burner assembly 14.

A pair of circumferentially spaced-apart flanged brackets 106, 108 are secured to the outer surface of cylindrical wall 40, as by spot welding as at 110 and 112, respectively. Brackets 106, 108 further include flange portions 114, 116, respectively, which extend parallel to the outer surface of cylindrical wall 40. A circular opening 120 extends through cylindrical wall 40 between flanged brackets 106, 108 and communicates between the chamber 132 and the atmosphere. A suitable fibrous pad 122 is removably secured over opening 120 by means of the brackets 106, 108. Pad 122 may be made of a material such as rock wool, fiber glass, or the like and functions as a filter means for preventing the passage of contaminents into the damper 10 and reduces the effect of drafts in the vicinity thereof.

A plurality of threaded mounting studs 124 are secured to annular wall 42 as shown, studs 124 being disposed in a circular array and adapted to be received through suitable mounting holes (not shown) in the mounting flange 126 of burner assembly 14, burner assembly 14 being secured in position by means of suitable threaded fasteners 128.

It will now be observed that the unidirectional valve means 66 divides the space bounded by housing 50 and the space bounded by cylindrical wall 40 and annular walls 28, 42 into serially connected chambers 130 and 132, chamber 130 communicating with combustion chamber 18 via port 62, and chamber 132 communicating with the atmosphere via opening 120.

In operation, fuel oil is fed into burner assembly 14, mixed with air, and ignited. The ignited air-fuel mixture is then discharged from the blast-tube 16 into combustion chamber 18 as indicated by arrows 134. Under steady state operation, the pressure within pressure chamber 18 is relatively constant. However, at the time of initial ignition of the air-fuel mixture, complete burning of the air-fuel mixture does not immediately occur and an excess of combustible fuel is correspondingly discharged from the blast-tube 16 and enters combustion chamber 18. This excess of combustible air-fuel mixture does, however, ignite within moments after its discharge from the blast-tube 16. When this occurs, the burning of the excess mixture causes a surge or impulse of pressure within combustion chamber 18 which pressure-pulse is propagated longitudinally through radiant heating tube 20 as indicated by arrows 136. This propagation of the pressure-pulse through heating tube 20 in turn produces a pressure node with combustion chamber 18, the pressure of this node being sub-atmospheric.

During the above described cycle the initial pressure surge within combustion chamber 18 will cause a corresponding increase of pressure within chamber 130, this pressure exerting a force on flapper 74 which tends to more tightly close same. However, when the pressure node occurs, the sub-atmospheric pressure within chamber 12, and the corresponding reduction of pressure within chamber 130 causes flapper 74 to pivot open. Simultaneously, atmospheric air is permitted to flow via chambers 132 and 130 into combustion chamber 18. This flow of air is almost instantaneous and functions to counteract and thereby reduce or substantially eliminate the pressure node.

In a similar manner, it will be apparent that the pressure node which occurs in combustion chamber 18 will normally tend to cause a subsequent surge of air-fuel mixture into combustion chamber 18 due to the reduced pressure therein. This would in turn produce another positive pressure-pulse by reason of an increased flow of air-fuel mixture thereinto. This pressure-pulse would, as above, be followed by a subsequent pressure node. This action, combined with the tendency of the elongated heating tube 20 to have a resonant frequency, can cause the combustion within combustion chamber 18 to resonate. However, with the damper 10 installed on the heating system 12, the initial and subsequent pressure nodes are reduced or eliminated thereby substantially reducing or eliminating the tendency of the system to pulsate.

Further, the pressure-pulse which occurs during the initial ignition of the air-fuel mixture and the subsequently occurring pressure node further result in an incomplete combusiton of the oil. This incomplete combustion in turn produces a significant quantity of smoke within combustion chamber 18. Normally, this smoke would simply be discharged longitudinally through radiant heating tube 20 to be ultimately discharged into the surrounding area. However, with the damper assembly 10 installed on the system, the smoke produced within combustion chamber 18 is drawn therefrom via chamber portion 130, through opening 70 and into the burner assembly 14 via duct 102. The incompletely burned fuel is then reburned thereby eliminating the smoke.

Referring now to FIG. 4, there is illustrated a second embodiment of a pressure-pulse relief damper 150 for use on a gas burning, tube-fired radiant heating system 152. Heating system 152 again includes a burner assembly shown partially at 154 which is adapted to mix a suitable gaseous fuel such as natural gas or propane gas with air and ignite same. The burned gases are discharged via blast-tube 156 into an elongated, hollow radiant heating tube 158. In this type of system, heating tube 158 also functions as the combustion chamber.

Mounted on the top (as viewed in FIG. 4) of heating tube 158 is a housing 160 which includes trapezium-shaped side walls as at 162, angled end walls 164, 166, and a top wall 168.

End wall 166 is provided with a circular opening 170 therethrough which communicates between the chamber 172 defined by housing walls 162 through 166 and the atmosphere. A flapper element 174 is again pivotably secured adjacent its upper peripheral extremity to end wall 166 by means of a suitable hinge 176. Flapper element 174 is pivotably movable as indicated by arrow 180 between a first position closing opening 170 and a second position in which opening 170 is open. A weighted disk 182 may be secured to flapper 174 by means of a suitable threaded fastener 184 to increase the pressure required to open flapper 174. A circular port 186 communicates between chamber 172 and the interior 188 of heating tube 158 adjacent the blast-tube 156 of burner assembly 152.

A suitable upstanding, threaded stud 190 is fixedly mounted to the top wall 168 of housing 150 to provide a means for securing a suitable heat reflector (not shown) above the heating system.

In operation, air and fuel are again mixed in the burner assembly 154, and ignited, in this case by means of a suitable pilot light (not shown) and discharged from the burner assembly 154 via blast-tube 156. The burning gases enter the interior 188 of heating tube 158. When the heating system is first turned on, there is again produced a positive pressure surge by reason of the momentary delay in the combustion of the air-fuel mixture. This positive pressure surge again produces a sub-atmospheric pressure node within the interior 188 of heating tube 158. However, by reason of damper assembly 150, atmospheric air is permitted to enter interior 188 of heating tube 158 via opening 170 thereby again eliminating or substantially reducing the pressure node.

In the case of a gas-burning heating system, another problem is encountered when the system is turned off. In this situation, the momentum of the burning gases traveling through heating tube 158 again produces a pressure node within the heating tube 158. This can cause the pilot flame within the burner assembly 154 to be extinguished. However, by reason of the addition of the pressure relief damper assembly 150, this pressure node is again substantially reduced or eliminated since the damper assembly 150 permits fresh air to enter the interior 188 of heating tube 158 via opening 170. This passage of air into heating tube 158 does not pass adjacent the pilot flame within burner assembly 154 and thereby the pressure node is eliminated without any danger of extinguishing the pilot flame within burner assembly 154.

It will further be observed that when the fuel being burned is gas, the incomplete combustion of the air-fuel mixture during initial ignition of the system does not produce any smoke within the heating tube 158, this being a characteristic of the fuel being burned. It is therefore unnecessary to provide the pressure relief damper 150 with the second chamber 132 and duct 102 communicating therefrom to the combustion chamber of the burner assembly.

It is thus seen that the damper assembly of the present invention provides an effective, reliable, and relatively inexpensive apparatus which substantially reduces or eliminates the tendency of tube-fired radiant heating system to pulsate both at the time of ignition thereof and during steady state operation. The damper further eliminates pressure nodes within the system which may cause a pilot flame within a gas-fired system to be extinguished. Similarly, the damper assembly provides a simple, yet effective means, for eliminating smoke produced during periods of ignition in an oil-fired system.

While there have been described above the principles of this invention in connection with specific apparatus, it is to be clearly understood that this description is made only by way of example and not as a limitation to the scope of the invention.

What is claimed:

1. In a tube-fired radiant heating system the combination comprising a fuel combusting device having a blast tube and an elongated hollow radiant heating tube serially coupled thereto, a pressure-pulse relief damper including a first chamber including a plurality of walls, one of said walls being disposed at an angle with respect to a vertical plane and having a surface facing upwardly at an angle, said first chamber having therein a first opening communicating between said first chamber and the interior of the radiant heating tube at a point adjacent the fuel combusting device and means including a second opening in said one of said walls and disposed remotely with respect to said first opening for pneumatically coupling said first chamber to the atmosphere, a normally closed, unidirectional valve means for preventing the flow of air through said second opening from said radiant heating tube to the atmosphere and responsive to sub-atmospheric pressure in said radiant heating tube for permitting the flow of air from the atmosphere into said radiant heating tube, said valve means including a flapper element pivotably secured adjacent its upwardly disposed peripheral extremity to said upwardly facing surface for swinging movement between a first a second position, said element closing said second opening when in said first position and said second opening being open when said element is in said second position, the weight of said element maintaining said flapper element in said first position.

2. The combination of claim 1 further including means for increasing the magnitude of the sub-atmospheric pressure required to move said flapper from said first to said second position.

3. The combination of claim 2 wherein said pressure increasing means is a weight fixedly secured to said flapper element.

4. The combination of claim 1 wherein said radiation combusting device is adapted to burn oil as a fuel and said radiant heating tube includes a combustion chamber serially connected to said blast tube, said damper further including a second chamber having a generally annular shaped first portion positioned between said combustion chamber and said fuel combusting device and encircling said blast-tube and a second portion fixedly secured to the upwardly disposed outer surface of said first portion and communicating between said first chamber and said annular portion, said one of said walls being disposed between said first chamber and said second portion of said second chamber, said first opening communicating between said first chamber and said combustion chamber, and a third opening extending through a distally disposed extremity of said annular portion and communicating with the atmosphere.

5. The combination of claim 4 further comprising filter means covering said third opening for restricting the flow of contaminents therethrough.

6. The combination of claim 5 wherein said filter means includes a pad of flame resistant, fibrous material.

7. The combination of claim 4 further comprising a conduit communicating at one end thereof with said second portion of said second chamber, and at its other end with said fuel combusting device whereby, smoke accumulated in said second portion is drawn therefrom into said fuel combusting device.

8. The combination of claim 7 further including a fourth opening in said second portion of said second chamber, and means for selectively closing said fourth opening.

9. The combination of claim 8 wherein said closing means includes a generally flat closure member pivotably secured to said second chamber and movable between first and second positions, said closure covering said fourth opening when corresponds said first position thereof, said fourth opening being open when said closure is in said second position thereof, and a spring operatively coupled to said closure member for resiliently urging same into said first position thereof.

10. The combination of claim 1 wherein said fuel combusting device is a gas burner.

* * * * *

UNITED STATES PATENT OFFICE
CERTIFICATE OF CORRECTION

Patent No. 3,786,799  Dated January 22, 1974

Inventor(s) Paul D. Cox

It is certified that error appears in the above-identified patent and that said Letters Patent are hereby corrected as shown below:

IN THE SPECIFICATION

Column 2, line 25  delete "1,3,3-trimethylindolinobenzopyrylospiran"

Column 2, line 25  after "still" insert -- another --

Column 4, line 61  change "with" to -- within --

IN THE CLAIMS

Claim 1, column 7, line 1  after "elongated" insert -- and --

Claim 4, column 7, line 35  change "radiation" to -- fuel --

Claim 9, column 8, line 33  change "corresponds" to -- in --

Signed and sealed this 2nd day of July 1974.

(SEAL)
Attest:

EDWARD M. FLETCHER,JR.  C. MARSHALL DANN
Attesting Officer  Commissioner of Patents